United States Patent Office.

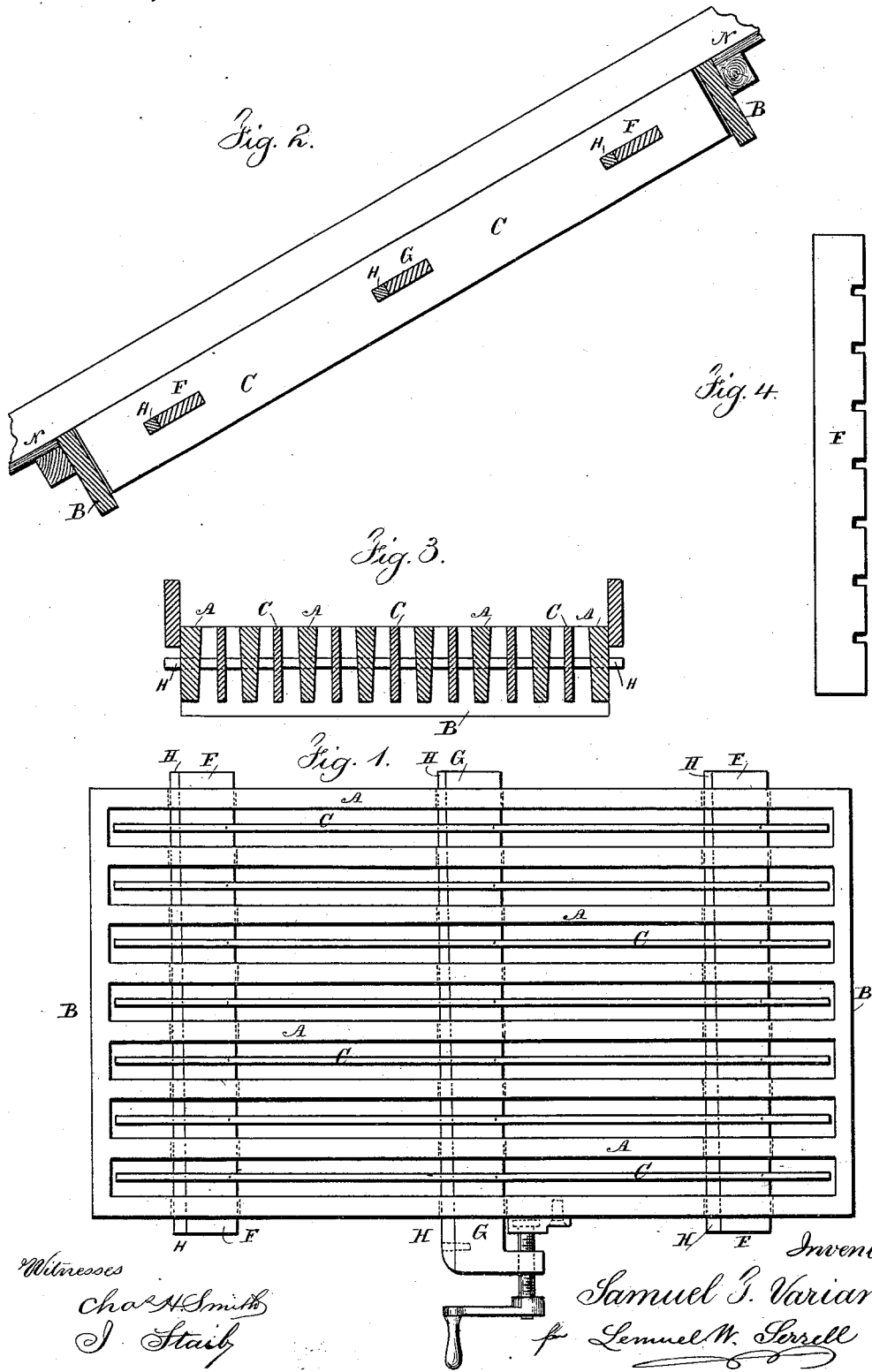

SAMUEL T. VARIAN, OF EAST ORANGE, NEW JERSEY.

SCREEN FOR COAL AND OTHER MATERIALS.

SPECIFICATION forming part of Letters Patent No. 336,271, dated February 16, 1886.

Application filed July 27, 1885. Serial No. 142,779. (No model.)

*To all whom it may concern:*

Be it known that I, SAMUEL T. VARIAN, of East Orange, in the county of Essex and State of New Jersey, have invented an Improvement in Screens for Coal and other Materials, of which the following is a specification.

Screens for coal have been made with two sets of bars, one stationary and the other movable, so that the spaces between the bars can be varied by adjusting the movable sets of bars, the object being to readily adapt the screen to the removal of dust and finer sizes of coal from the coal that is being delivered from a chute into a car or boat. A screen of this character may be seen in Letters Patent No. 319,149, issued to me June 2, 1885.

My present invention is intended for the same object; and it consists in a screen made of stationary bars with intermediate movable bars, which are united preferably by notched cross-bars and sliding keys through mortises in the stationary bars, so that all the movable bars can be adjusted simultaneously. When the adjustable bars are midway between the stationary bars the openings at each side of each adjustable bar are the same width, and the screen is adapted to the separation of dust and small pieces from the smallest size of coal. When the movable bars are adjusted so as to come up against one side of each stationary bar, the openings in the screen are made the widest, and the screen is adapted to the separation of the smallest from the largest sizes of coal, the intermediate sizes being regulated according to the width of the slots between the stationary and the adjustable bars.

In the drawings, Figure 1 is a plan view of the screen complete. Fig. 2 is a longitudinal section of the screen. Fig. 3 is a transverse section, and Fig. 4 is a plan of one of the transverse notched bars separate.

A A represents the stationary bars, and B B the end bars or bearers, to which the bars A A are attached or with which they are cast. The bars A A are usually placed at an inclination in the bottom of the chute or slide N, down which the coal is delivered.

C C are the intermediate bars, there being one for each slot or opening between the bars A A. The intermediate bars, C C, are connected so that they can all be move laterally at once. For this purpose I prefer and use cross-bars F F and G and the keys H. The bars A A are mortised for the bars F F and G and keys H to pass freely therethrough. The mortises in the bars C correspond to the mortises in the bars A, except that those in the bars A are the longest. The bars F F and G are notched upon their edges (the notches being a little wider than the thickness of the movable bars C) and passed laterally through the bars A and C, and the notches therein receive the bars C, which are retained in place by the keys H, which fill the spaces in the mortises, thus interlocking the bars C with the bars F F and G. When motion is given endwise to the bar G by a lever and link, as in my patent referred to, or by a screw and crank, as shown, or otherwise, the bars C are adjusted laterally and held in position. It will now be understood that the openings between the bars depend upon the position to which the bars C may be moved. Said openings may be uniform in width between the bars A C for the smallest sizes of coal, or the openings on one side of the bars C may be wider than the openings on the other side of said bars C, the size of the openings always determining the sizes of coal that will not pass through the screen, as aforesaid.

I claim as my invention—

1. The combination, with the stationary bars A and the end bars, B, of the bars C, between the bars A, and the connecting-bars F G, passing through mortises in the bars A and C, and to which bars F G the bars C are permanently connected, substantially as specified.

2. The combination, with the stationary bars A A, of the intermediate movable bars, C, the notched bars F F and G, and the keys H, connecting the bars C, said bars F F and G passing through mortises in the bars A and C, substantially as set forth.

Signed by me this 23d day of July, A. D. 1885.

SAMUEL T. VARIAN.

Witnesses:
 GEO. T. PINCKNEY,
 WILLIAM G. MOTT.